United States Patent
Cryer

[15] 3,643,622
[45] Feb. 22, 1972

[54] POSITION INDICATORS

[72] Inventor: Edward Cryer, Higham near Burnley, England

[73] Assignee: Joseph Lucas (Industries) Limited, Birmingham, England

[22] Filed: July 10, 1970

[21] Appl. No.: 53,913

[30] Foreign Application Priority Data

Aug. 12, 1969 Great Britain......................40,190/69

[52] U.S. Cl..................................116/124, 40/130, 74/475, 200/166, 240/1 EI, 250/227, 340/380, 350/96, 353/97
[51] Int. Cl..................................................G09f 9/00
[58] Field of Search................116/124, 135; 240/1 EI, 10.1; 250/227; 340/380, 54; 353/97; 40/130 K; 350/96 B, 124; 200/166 SD; 74/844, 473, 475

[56] References Cited

UNITED STATES PATENTS

| | | | |
|---|---|---|---|
| 1,845,530 | 2/1932 | Tarallo | 40/130 K UX |
| 2,263,281 | 11/1941 | Von Tadden | 40/130 K X |
| 2,286,014 | 6/1942 | Rowe | 40/130 K UX |
| 2,303,049 | 11/1942 | Ingalls | 116/124 |
| 2,561,508 | 7/1951 | Gregorie et al. | 116/129 |
| 2,672,116 | 3/1954 | Gunderson | 116/124 |
| 2,881,976 | 4/1959 | Greanias | 340/380 UX |
| 3,169,305 | 2/1965 | Gray | 340/380 X |
| 3,231,857 | 1/1966 | Miller | 340/54 |

Primary Examiner—Louis J. Capozi
Attorney—Holman & Stern

[57] ABSTRACT

A position indicator includes a display panel which receives one end of each of a plurality of optical cables, the one ends of the optical cables being disposed to form a composite pattern such that predetermined sets of the one ends define required legends. The other ends of the optical cables terminate in a receiving station and the indicator further includes a light source capable of illuminating the other ends of the optical cables and a mask mounted for sliding movement between the light source and the receiving station. The mask serves in different positions to permit illumination of the other ends of only those optical cables whose one ends define, at the display panel, the legend corresponding to the position of the mask.

2 Claims, 4 Drawing Figures

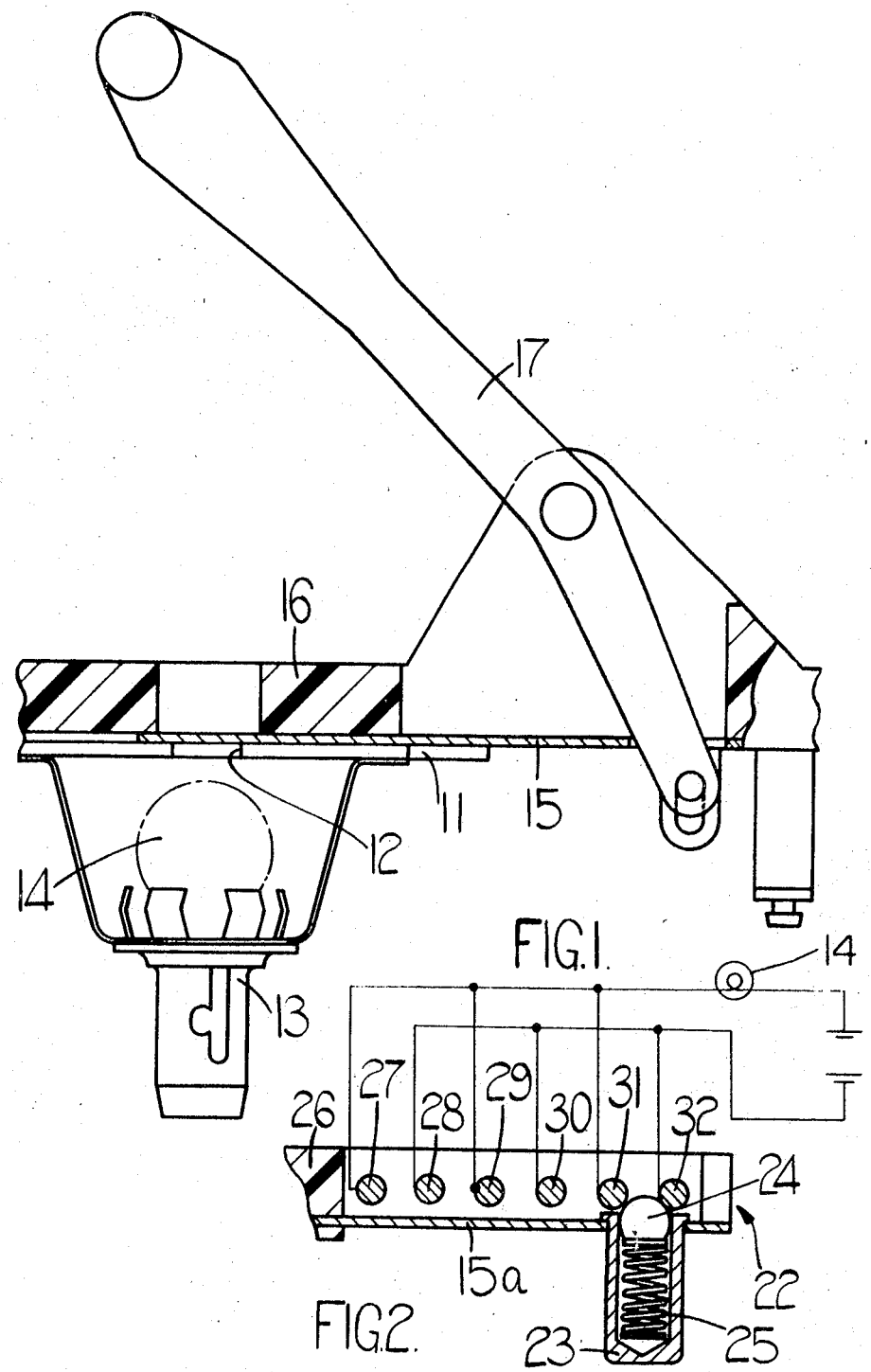

POSITION INDICATORS

This invention relates to position indicators particularly but not exclusively for indicating the position of a gear-selector lever of a road vehicle.

An indicator according to the invention includes a display panel which receives one end of each of a plurality of optical cables, said one ends of the optical cables being disposed to form a composite pattern such that predetermined sets of said one ends define required legends, a receiving station wherein the other ends of the optical cables terminate, a light source capable of illuminating said other ends of the optical cables and a mask mounted for sliding movement between said light source and said receiving station, said mask serving in different positions to permit illumination of said other ends of only those optical cables said one ends of which define, at the display panel, the legend corresponding to the position of the mask.

Figure 3:
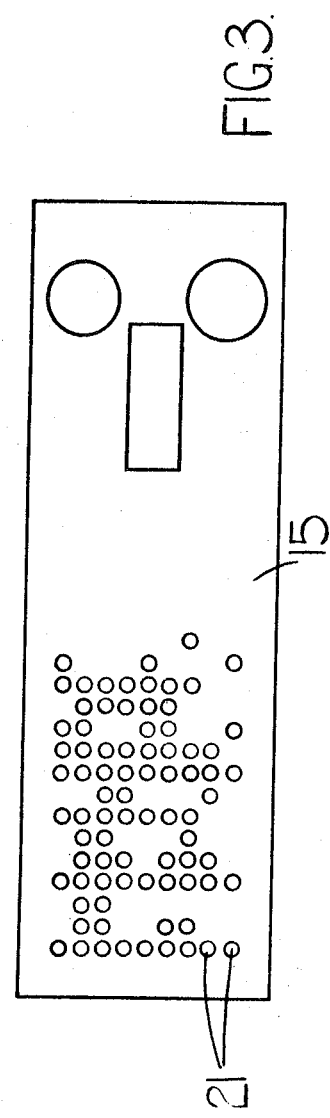
Figure 4:
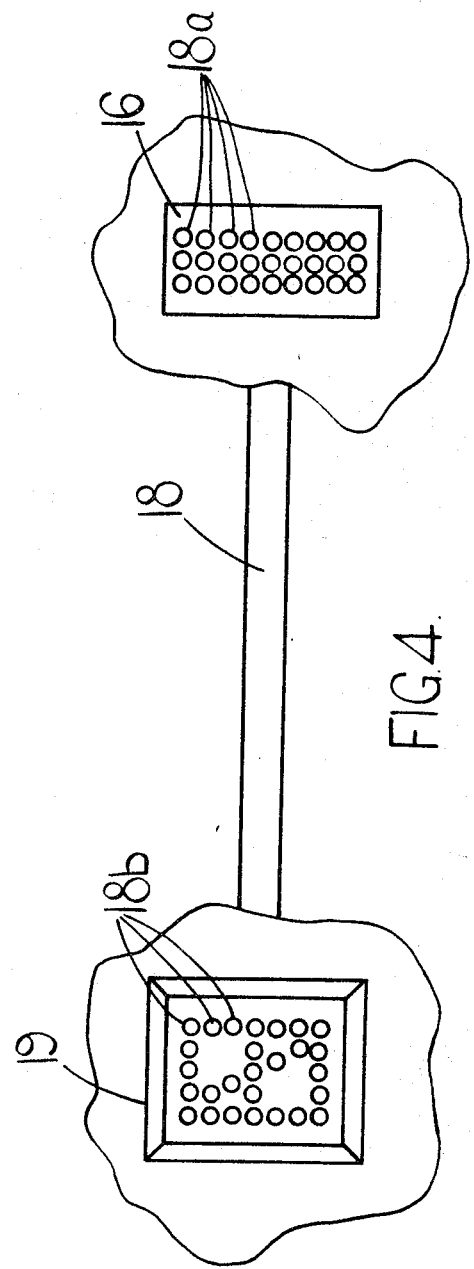

One example of the invention is illustrated in the accompanying drawing, wherein, FIG. 1 is a fragmentary sectional view of a position indicator associated with a gear change lever of a road vehicle, FIG. 2 is an enlarged fragmentary sectional view of part of FIG. 1, FIG. 3 is a plan view of a mask shown in FIG. 1, and FIG. 4 is a diagrammatic illustration of a further part of the indicator shown in FIG. 1.

Referring to the drawings, the indicator includes a plate 11 having therein an aperture 12. Secured to one side of the plate 11 is a bulb holder 13 carrying a bulb 14 so positioned that light from the bulb 14 passes through the aperture 12. Positioned on the side of the plate 11 remote from the bulb holder 13 is a receiver block 16, and slidable between the plate 11 and the block 16 is an opaque mask 15. The mask 15 is in the form of a plain plate, and at its end remote from the block 16 the mask 15 is coupled to a gear-selector lever 17 of an automatic gearbox of the road vehicle utilizing the indicator. The connection between the lever 17 and the mask 15 is such that the mask 15 is moved linearly across the aperture 12 as the lever 17 is moved between its predetermined positions. Extending through the receiver block 16 and secured thereto are 27 optical cables 18 the ends 18a of which lie in the plane of the surface of the block 16 presented to the mask 15, and which are arranged in three parallel rows of nine across the width of the mask 15. The optical cables 18 extend from the block 16 to a display panel 19 positioned on the dashboard of the vehicle and at the display panel 19 the other ends 18b of the optical cables 18 are arranged in a predetermined composite pattern such that given sets of the 27 ends 18b constitute predetermined legends. The legends which can be formed by the composite pattern on the display panel 19 are the letters P, R, N, D, and L which correspond to the five operative positions of the lever 17, namely, park, reverse, neutral, drive, and low. Thus, it will be appreciated that by illuminating predetermined ends 18a of the cables 18 the predetermined legend will be illuminated on the panel 19.

The mask 15 is formed at its end remote from the lever 17 which a predetermined pattern of apertures 21 which extend in transverse rows across the width of the mask 15. The spacing of the apertures 21 is substantially equal to the spacing of the ends 18a in the block 16, and so as the mask 15 passes over the block 16 certain combinations of the ends 18a of the cables 18 will be exposed through the apertures in the mask 15. The apertures 21 are arranged in five sets which are spaced along the length of the mask, and the arrangement of apertures 21 in each set is such that the ends 18a which are exposed through the apertures 21 in each set correspond to the ends 18b at the panel 19 which produce the letter equivalent to the position of the mask. Thus, when the first set of apertures 21 in the mask 15 is positioned between the light source 14 and the block 16, then the ends 18a of the cables which receive light from the source 14 through the apertures 21 in the first set, correspond to the ends 18b of the cables 18 which are arranged on the panel 19 to produce the letter P.

In order to locate the mask 15, and the lever 17, in any one of five positions there is provided a detent arrangement 22 (FIG. 2). The detent arrangement 22 consists of a hollow sleeve 23 which is carried by a part 15a movable with the mask 15. The sleeve 23 is closed at its end remote from the part 15a, and a steel ball 24 is urged outwardly from the sleeve 23 by a spring 25. The part 15a is slidable relative to a fixed member 26, conveniently part of the block 16 and which carries six conductive bars 27, 28, 29, 30, 31, and 32 the bars being arranged parallel to one another, and spaced apart by a distance slightly less than the diameter of the ball 24. The ball 24 is urged by the spring 25 into engagement with any two of the conductive bars, the ball 24 engaging partially between the two bars so that movement of the part 15a and therefore movement of the mask 15 is resisted by the spring 25. However, the length of the lever 17, and the rating of the spring 25 are so corrulated that movement of the mask 15 by the lever 17 is relatively easy although resistance to movement between the five operative positions can be felt by the operator.

The conductive bars 27, 29, and 31 of the detent arrangement 22 are electrically earthed, and the bars 28, 30, and 32 are electrically connected through the bulb 14 to one pole of the battery of the road vehicle, the other pole of the battery of the vehicle being earthed. Thus, in each of the five positions the ball 24 is bridging an earthed bar and a live bar, and so completes the circuit to the bulb 14 to energize the bulb. However, during movement between the positions the ball 24 is engaged with only one of the bars and so the circuit to the bulb is broken and the bulb is not energized. Thus, during movement between the operative positions the progressive change in legend on the panel 19 is not visible, the bulb 14 being energized only when the stable position is reached. For example, during the change from the park position to the reverse gear position, the display panel 19 will initially show the illuminated letter P. As the lever 17 is moved the bulb 14 will be deenergized, and the panel 19 will appear blank. When the lever 17 reaches the reverse gear position, the bulb 14 will once again be energized, and at this time the mask 15 will already be in the position wherein the set of apertures 21 corresponding to the letter R are in position. Thus, when the panel 19 is reilluminated it will carry the letter R.

Having thus described my invention what I claim as new and desire to secure by Letters Patent is:

1. A position indicator including a display panel, a plurality of optical cables, one end of each of said optical cables being received at said display panel, said one ends of the optical cables being disposed to form a composite pattern such that predetermined sets of said one ends define required legends, a receiving station wherein the other ends of said optical cables terminate, a light source illuminating said other ends of said optical cables, and, a mask mounted for sliding movement between the light source and the receiving station, the mask serving in different positions to permit illumination of said other ends of only those optical cables said one ends of which define, at the display panel, the legend corresponding to the position of the mask, detent means releasably retaining said mask in any one of a plurality of different positions, said detent means comprising a plurality of fixed conducted bars, and a conductive ball, the conductive ball being movable with the mask, and being resiliently urged into engagement with respective pairs of said conducted bars in each of said different positions of the mask, said bars being electrically connected in circuit with said light source, so that when said conductive ball engages a pair of bars then a light source is energized and illuminates said other ends of the optical cable to produce the required legend at the display panel, but when said ball engages only one bar, during movement of the mask between said different positions, then said light source is not energized, so that no image is produced at said display panel.

2. An indicator as claimed in claim 1 wherein said mask is coupled for movement with the gear-selector lever of an automatic gearbox of a road vehicle and wherein said legends defined at the display panel correspond to the operative positions of the lever respectively.